United States Patent [15] 3,661,573

Laridon et al. [45] May 9, 1972

[54] LIGHT-SENSITIVE COMPOUNDS

[72] Inventors: Urbain Leopold Laridon, Wilrijk; Gerard Albert Delzenne, 's-Gravenwezel; Hugo Karel Peeters, Berchem, all of Belgium

[73] Assignee: Gevaert-AGFA N.V., Mortsel, Belgium

[22] Filed: Oct. 9, 1969

[21] Appl. No.: 865,185

[30] Foreign Application Priority Data

Nov. 26, 1968 Great Britain ....................56,095/68

[52] U.S. Cl. ....................................96/33, 96/36.3, 96/49, 96/75, 96/91

[51] Int. Cl. ......................G03c 1/52, G03f 7/02, G03f 7/08

[58] Field of Search .......................96/49, 75, 91 R, 33, 36.3

[56] References Cited

UNITED STATES PATENTS

| | | | |
|---|---|---|---|
| 3,338,711 | 8/1967 | Boes | 96/49 |
| 3,471,289 | 10/1969 | Herrick | 96/33 |
| 3,501,296 | 3/1970 | Delzenne | 96/33 |
| 3,522,042 | 7/1970 | Borchers et al. | 96/49 X |
| 3,526,503 | 9/1970 | Dunham et al. | 96/49 X |
| 3,549,373 | 12/1970 | Hamada et al. | 96/75 |
| 3,554,751 | 1/1971 | Thomas | 96/33 |
| 3,578,457 | 5/1971 | Houtman et al. | 96/91 R |

*Primary Examiner*—Harold Ansher
*Attorney*—Alfred W. Breiner

[57] ABSTRACT

A copying material for use in the photochemical preparation of printing plates comprises a support and a light-sensitive coating formed from an intimate mixture of an alkali-soluble polymer and a compound of the formula:

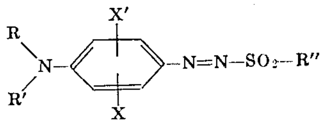

wherein:

R = hydrogen, alkyl or phenyl;
R' = alkyl, phenyl, naphthyl, benzoyl, alkoxybenzoyl, acryloyl, methacryloyl or alkylsulphonylaminoalkyl;
R'' = phenyl, alkylphenyl, aminophenyl, dialkylaminophenyl or acylaminophenyl;
X = hydrogen, halogen, nitro, alkyl or alkoxy;
X' = hydrogen, halogen, or alkoxy.

On image-wise exposure to actinic light and dissolving the exposed portions of the coating in an aqueous alkaline liquid, a positive printing plate is formed.

10 Claims, No Drawings

LIGHT-SENSITIVE COMPOUNDS

The present invention relates to light-sensitive compounds and to the production of light-sensitive coatings for use in the manufacture of copying materials, more particularly of copying materials yielding positive images.

It is well known to produce so-called tanned images in a layer consisting of a colloid that is hardened by products produced by the action of light upon certain light-sensitive substances, which are homogeneously dispersed in that colloid. Among these light-sensitive substances are known salts of chromic acid, some diazo compounds, and the like. The colloids hardened by the action of light are capable of retaining greasy ink, or can be used for the photochemical production of printing plates. The printing plates obtained by these methods, however, are negative with respect to the master pattern, and further treatments are necessary to transform these negative printing images into images that are positive with respect to the master pattern.

It has been found now that a light-sensitive system based on the phototransformation of a new class of compounds containing a diazosulphone group can be used for recording and reproducing optical information, yielding directly positive images or printing plates.

According to the invention a copying material for use in the photochemical preparation of printing plates is provided, which comprises a support carrying a light-sensitive coating comprising an intimate mixture of an alkali-soluble polymer and a compound comprising a diazosulphone group, said compound corresponding to the general formula:

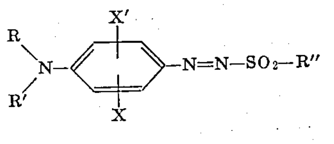

wherein:

R represents hydrogen, alkyl of 1 to 4 carbon atoms or phenyl;

R′ represents alkyl of 1 to 16 carbon atoms, phenyl, naphthyl, benzoyl, alkoxybenzoyl with alkyl groups of 1 or 2 carbon atoms, acryloyl, methacryloyl or alkylsulphonylaminoalkyl, wherein the alkyl groups comprise 1 or 2 carbon atoms, R″ represents phenyl, alkylphenyl with alkyl of 1 to 4 carbon atoms, aminophenyl, dialkylaminophenyl with alkyl groups of 1 to 4 carbon atoms or acylaminophenyl wherein the alkyl group comprises 1 to 4 carbon atoms;

X represents hydrogen, halogen, nitro, alkyl of 1 to 4 carbon atoms and alkoxy with 1 to 4 carbon atoms; and X′ represents hydrogen, halogen, or alkoxy with 1 to 4 carbon atoms.

For facility's sake the compounds that contain a diazosulphone group will be named "diazosulphones" in the following description and specific compounds will be named as the diimides as seen from the naming of specific compounds at pages 4 and 5, the examples, and in the claims. This nomenclature is in accordance with the *Seventh Collective Index of Chemical Abstracts* 1962–1966.

As alkali-soluble polymers in the light-sensitive layer copolymers of unsaturated carboxylic acids can be used, e.g., acrylic acid, methacrylic acid, crotonic acid, maleic acid, fumaric acid, itaconic acid, and citraconic acid. If the copolymer comprises an unsaturated dicarboxylic acid, the half-esters and half-amides thereof may be used too. These unsaturated carboxylic acids are copolymerized with ethylenically unsaturated compounds, which are substantially insoluble in an alkaline medium and present in the copolymer in such a proportion that the copolymer itself remains soluble in an alkaline medium. Suitable ethylenically unsaturated compounds are styrene and its derivatives, vinyl chloride, vinylidene chloride, vinyl esters, e.g., vinyl acetate, acrylic acid esters, methacrylic acid esters, acrylonitrile, methacrylonitrile, etc.

Preferred alkali-soluble polymers, however, are the so-called novolaks. According to British Standard 1755–1951 these are "soluble, fusible, synthetic resins produced from a phenol and an aldehyde, having no reactive groups (i.e., methylol groups) in the molecule and therefore incapable of condensing with other novolak molecules on heating without the addition of hardening agents."

The amount of alkali-soluble resin added to the light-sensitive coating may vary within wide limits, but in general at least four parts by weight of alkali-soluble resin are present for each part by weight of diazosulphone.

The light-sensitive coating consists of a mixture of a diazosulphone and an alkali-soluble polymeric material. This coating may also comprise minor amounts of additives, which increase the light-sensitivity of the diazosulphones.

The light-sensitive coating may also comprise stabilizers, plasticizers, extenders, dyes and the like. By "light-sensitive composition" in the accompanying description there is meant a composition comprising the light-sensitive diazosulphone, the alkali soluble polymer, and occasionally other additives.

The following are examples of diazosulphones that are suitable for being incorporated in a copying material according to the invention:

1. (phenylsulphonyl)-(p-diethylaminophenyl)-diimide
2. (p-tolylsulphonyl)-(p-dimethylaminophenyl)-diimide
3. (p-tolylsulphonyl)-(p-diethylaminophenyl)-diimide
4. (p-tolylsulphonyl)-[2,6-dibromo-4(dimethylamino)-phenyl]-diimide
5. (p-tolylsulphonyl)-(4-dimethylamino-2-nitro-phenyl)-diimide
6. (p-tolylsulphonyl)-(4-diethylamino-2-methyl-phenyl)-diimide
7. (p-tolylsulphonyl)-{4-[N-ethyl-N-β(methylsulphonylamino-ethyl)-amino]-2-methyl-phenyl}-diimide
8. (p-tolylsulphonyl)-(p-anilinophenyl)-diimide
9. (p-tolysulphonyl)-(N-methyl-N-phenyl-p-aminophenyl)-diimide
10. (p-tolysulphonyl)-[p(2-naphthylamino)-phenyl]-diimide
11. (p-tolysulphonyl)-(p-ethylaminophenyl)-diimide
12. (p-tolysulphonyl)-(p-cetylaminophenyl)-diimide.
13. (p-tolysulphonyl)-)(p-benzamidophenyl)-diimide
14. (p-tolysulphonyl)-[p(p′-methoxybenzamido)-phenyl]-diimide
15. (p-tolylsulphonyl)-(p-methacrylamidophenyl)-diimide
16. (p-tolysulphonyl)-(p-diphenylaminophenyl)-diimide
17. (p-aminophenylsulphonyl)-(p-diethylaminophenyl)-diimide
18. p-dimethylaminophenylsulphonyl)-(p-diethylaminophenyl)-diimide
19. (p-acetamidophenylsulphonyl)-(p-diethylaminophenyl)-diimide
20. (p-acetamidophenylsulphonyl)-(p-anilinophenyl)-diimide
21. (p-acetamidophenylsulphonyl)-(4-benzamido-2,5-diethoxyphenyl)-diimide These and other diazosulphones are easily synthetized starting from diazonium salts and sulphonic acids.

For preparing a copying material in accordance with the invention a support is coated with a solution in an organic solvent or in a mixture of organic solvents of preferably low dielectric constant of diazosulphones hereinbefore described and alkali-soluble polymer, which mixture may include other additives. Metal supports, or supports coated with metals, e.g., zinc and especially aluminium are excellently suited as support materials for a printing plate. It is not strictly necessary to subject the metal supports to be used to any preliminary chemical treatment in order to render their surfaces suitable for accepting the light-sensitive layer. A simple mechanical roughening of the metallic surface proves to be quite sufficient for the application of the light-sensitive layer, which firmly adheres to the metallic base in the form of a thin uniform film. For the production of planographic printing plates there can also be used, e.g., plates of stone or glass and also especially treated sheets of paper or plastic foils.

The base or support is coated by whirlcoating, brushing or spraying with a solution of the light-sensitive composition in a suitable solvent, or may be coated continuously on known coating machines, whereupon the solvent or solvent mixture is eliminated by known means such as evaporation, thus leaving a more or less thin coating of the light-sensitive composition on the base or support. The thickness of the light-sensitive layer obtained may be from about 0.5 to 20 μ and is preferably between 1 and 5 μ. The light-sensitive coating is then ready for exposure to actinic light rays. The light source should preferably furnish an effective amount of ultraviolet radiation. Suitable sources of light include carbon arcs, xenon lamps, mercury vapor lamps, fluorescent lamps, argon glow lamps, photographic flood lamps and tungsten lamps.

The light-sensitive layer is exposed to actinic light through a contacted transparent master pattern consisting solely of opaque and transparent areas, e.g., the so-called line or half-tone positive or negative, wherein the opaque areas are of the same optical density. However, it is also possible to expose the light-sensitive layer to a projected image. It is presumed that during exposure the light induces the photolytic transformation of the diazosulphone group into an alkali soluble decomposition product.

The development or removal of the coating in the exposed areas can be effected by means of water or an aqueous composition, preferably by means of an alkaline aqueous solution rapidly dissolving the image-wise decomposition products formed. A convenient alkaline developer is an aqueous solution of a phosphate of an alkaline metal, e.g., sodium phosphate.

In the unexposed portions of the printing plate the presence of the unconverted diazosulphones renders the light-sensitive layer insoluble in alkaline medium. Accordingly, the unexposed parts of the layer remain and constitute a positive image of the master pattern. These positive resist images can be used as printing plates, e.g., for planographic and offset printing. They may also be subjected to electroplating, which makes them suited for the preparation of printed circuits with galvanized contacts.

They may also be subjected to etching processes, which makes them suited for all photolithographic purposes, for chemical precision etching of various metals and for the preparation of printed circuits and semi-conductor integrated circuits, especially in the field of micro-miniaturized devices.

After removal of the exposed areas of the light-sensitive layer by the developing solution, the ink-repellency of the unshielded areas of the base material can be improved by an after-treatment with a lithographic preparation for hydrophilizing or enhancing the hydrophility of said areas. Compounds and compositions suited for that purpose are described, e.g., in the Canadian Pat. No. 658,050 of Gevaert Photo-Producten N.V., issued Feb. 19, 1963.

The ink-receptivity of the hydrophobic unexposed areas can be improved by treating the developed printing plate with a lacquer that adheres to the hydrophobic areas and forms an oleophilic deposit thereon. Suitable lacquers and the method of applying them are described in the Canadian Pat. Nos. 686,284, issued May 12, 1964 and 763,908, issued July 25, 1967 both of Gevaert Photo-Producten N.V.

When preparing a printing form for gravure printing, an exposure and etching technique are used whereby in the base material according to a screen pattern cells can be formed for receiving the printing ink.

Base materials suited for etching are well known and may substantially consist of zinc, copper, steel or an etchable magnesium alloy.

When preparing a planographic printing plate a base material is taken that is suited for lithographic printing, preferably a zinc sheet.

A special advantage of the use of the diazosulphones according to the invention is the easy way in which these products can be synthetized, starting from inexpensive raw materials. Further, the solubility of the light-sensitive system and also the particular solvent used to "develop" the photographic image, can be adapted to the final destination of the photochemically modified polymeric material. The fact that the present light-sensitive compositions can be prepared a considerable time before use constitutes a further advantage.

EXAMPLE 1

4 g. of novolak and 1 g. of (p-aminophenylsulphonyl)-(p-diethylaminophenyl)-diimide were (III) in 50 ml. of ethylene glycol monomethyl ether. The resulting solution was coated on a copper plate. Subsequently the coated copper plate was centrifuged at approximately 200 revolutions/minute. The plate was then dried for 10 minutes at 60° C. The light-sensitive layer formed was exposed for 4 minutes through a diapositive by means of an 80 watt high pressure mercury vapor lamp placed at a distance of 15 cm. The exposed layer was developed for 1 minute in a 1 percent aqueous solution of sodium hydroxide, whereby the exposed areas were washed away. The residual positive relief image of the original was rinsed with water and dried for 10 minutes at 60° C. The bared parts of the copper surface could be etched in an iron(III) chloride bath of 42° Baume. A sharp positive printing plate was obtained.

EXAMPLE 2

19 g. of novolak and 1 g. of (p-tolylsulphonyl)-(p-diethylaminophenyl)-diimide were dissolved in a mixture of 75 ml. of methyl glycol acetate and 25 ml. of butyl acetate. This solution was coated, in the same way as described in Example 1, on a copper plate, whereupon the coated plate was centrifuged and dried.

After exposure for 4 minutes as in Example 1, the plate was developed for 1 minute in a 0.75 percent aqueous solution of sodium hydroxide, rinsed with water and etched in an iron(III) chloride bath of 42° Baume.

When replacing the copper plate by a zinc plate, the development was carried out with a 0.5 percent aqueous solution of sodium hydroxide and the etching occurred with diluted nitric acid.

With the copper plate as well as with the zinc plate good printing plates were obtained.

EXAMPLE 3

The process of Example 2 was repeated, but the thickness of the layer was 1 μ and the support was an aluminium foil. The coated layer was dried for 10 minutes at 60° C. The exposure lasting 2 minutes was carried out as in Example 1. The image formed was developed by rubbing for 1 minute with a 1 percent aqueous solution of sodium hydroxide. After drying of the image, the plate was rubbed with a 1 percent aqueous solution of phosphoric acid and inked finally.

A fine positive offset printing plate was obtained.

EXAMPLE 4

9 g. of novolak and 1 g. of (p-tolysulphonyl)-(p-dimethylaminophenyl)-diimide were dissolved in 50 ml. of cyclohexanone. The resulting solution was coated on a copper plate. Subsequently, the coated plate was centrifuged at approximately 200 revolutions/minute. The plate was exposed through a diapositive by means of an 80 watt high pressure mercury vapor lamp at a distance of 15 cm., developed in a 0.5 percent aqueous solution of sodium hydroxide, rinsed with water, and etched with an iron(III) chloride bath of 42° Baume.

A fine positive printing plate was obtained.

EXAMPLE 5

4.5 g. of novolak and 0.5 g. of (p-tolysulphonyl)-(p-anilinophenyl)-diimide were dissolved in a mixture of 40 ml. of methyl glycol acetate and 10 ml. of butyl acetate.

A layer was coated on a copper plate in the same way as in Example 1, exposed for 2 minutes and developed for 30 seconds in a 1 percent aqueous solution of sodium hydroxide.

The bared copper was etched with an iron(III) chloride bath of 42° Baume.

EXAMPLE 6

The solution of Example 5 was coated on an aluminium foil to form a layer having a thickness of 1 μ. The resulting layer was dried for 10 minutes at 60° C., exposed through a diapositive for 2 minutes by means of an 80 watt high-pressure mercury vapor lamp, and developed by rubbing with a 1 percent aqueous solution of sodium hydroxide. After drying the positive image formed was rubbed with a 1 percent aqueous solution of phosphoric acid and then inked.

A fine offset printing plate was obtained.

EXAMPLE 7

2.25 g. of novolak and 0.25 g. of (p-tolysulphonyl)-(p-diphenylaminophenyl)-diimide were dissolved in a mixture of 10 ml. of methyl glycol acetate and 2.5 ml. of butyl acetate.

EXAMPLE 12

0.9 g. of novolak and 0.1 g. of (p-tolysulphonyl)-(4-benzamido-2,5-diethoxyphenyl)-diimide were dissolved in a mixture of 5 ml. of acetone and 5 ml. of methyl glycol acetate.

This solution was coated on a copper plate, as described in Example 1, exposed for 2 minutes and developed in a 0.85 percent aqueous solution of sodium hydroxide. A fine relief image was obtained.

EXAMPLE 13

According to the method described in Example 1, well defined amounts of novolak and of a compound comprising a diazosulphone group as indicated below were dissolved in a solvent or a mixture of solvents and the resulting solution coated on a copper plate. Exposure to light, followed by developing the image formed, occurred as in Example 1. Sharp positive printing plates were obtained after an exposure as indicated in the following table.

TABLE

| Diazosulphone (*) | Diazosulphone Amount, g. | Novolak, g. | First solvent | Second solvent | Exposure time | Developing solution |
|---|---|---|---|---|---|---|
| 1 | 0.25 | 0.9 | Ethylene glycol monomethyl ether, 3 ml | Acetone, 2 ml | 5′ | 1% NaOH |
| 4 | 0.1 | 0.9 | | Acetone, 10 ml | 4′ | 1% NaOH |
| 5 | 0.1 | 0.9 | | Acetone, 10 ml | 20′ | 1% NaOH |
| 9 | 0.1 | 0.9 | | Acetone, 30 ml | 4′ | 1% NaOH |
| 10 | 0.1 | 0.9 | Methyl glycol acetate, 5 ml | Acetone, 5 ml | 4′ | 0.7% NaOH |
| 11 | 1 | 19 | Methyl glycol acetate, 80 ml | Butylacetate, 20 ml | 4′ | 0.7% NaOH |
| 12 | 0.1 | 0.9 | Methyl glycol acetate, 2.5 ml | Xylene, 2.5 ml | 2′ | 0.85% NaOH |
| 13 | 0.1 | 0.9 | Ethylene glycol monomethyl ether, 5 ml | Acetone, 5 ml | 15′ | 1% NaOH |
| 14 | 0.1 | 0.9 | | Acetone, 10 ml | 15′ | 1% NaOH |
| 20 | 0.1 | 0.9 | Methyl glycol acetate, 5 ml | Acetone, 10 ml | 4′ | 0.7% NaOH |

*The numbers refer to the numbers of specific diazosulphones given above.

This solution was then coated as described in Example 5.

The resulting layer was exposed for 2 minutes and developed in a 1 percent aqueous solution of sodium hydroxide.

A fine positive image was obtained.

EXAMPLE 8

The process of Example 7 was repeated, but (p-tolysulphonyl)-(p-methacrylamidophenyl)-diimide was used as light-sensitive compound.

A fine printing plate was obtained after exposing the layer for 2 minutes.

EXAMPLE 9

The process of Example 7 was repeated with (p-tolysulphonyl)-{4[N-ethyl-N-β(methylsulphonylaminoethyl)-amino]-2-methylphenyl}-diimide as light-sensitive compound.

The layer was exposed for 4 minutes and developed with a 5 percent aqueous solution of sodium phosphate.

A fine relief image was obtained.

EXAMPLE 10

2.25 g. of novolak and 0.25 g. of (p-acetamidophenylsulphonyl)-(p-diethylaminophenyl)-diimide were dissolved in 12.5 ml. of cyclohexanone. This solution was coated on a copper plate, as described in Example 1, exposed for 4 minutes and developed in a 0.5 percent aqueous solution of sodium hydroxide.

A fine printing plate was obtained.

EXAMPLE 11

1.9 g. of novolak and 0.1 g. of (p-dimethylamino-phenylsulphonyl)-(p-diethylaminophenyl)-diimide were dissolved in a mixture of 10 ml. of methyl glycol acetate and 10 ml. of cyclohexanone. Example 3 was then repeated.

After an exposure of 4 minutes and a development of 2 minutes in a 0.5 percent aqueous solution of sodium hydroxide a fine relief image was obtained.

We claim:

1. Copying material for use in the photochemical preparation of printing plates, which comprises a support carrying a light-sensitive coating comprising an intimate mixture of an alkali-soluble polymer and a compound comprising a diazosulphone group, said compound corresponding to the general formula:

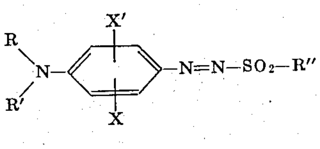

wherein:

R represents hydrogen, alkyl of 1 to 4 carbon atoms or phenyl;

R′ represents alkyl of 1 to 16 carbon atoms, phenyl, naphthyl, benzoyl, alkoxybenzoyl with alkyl groups of 1 or 2 carbon atoms, acryloyl, methacryloyl or alkylsulphonylaminoalkyl, wherein the alkyl groups comprise 1 or 2 carbon atoms;

R″ represents phenyl, alkylphenyl with alkyl of 1 to 4 carbon atoms, aminophenyl, dialkylaminophenyl with alkyl groups of 1 to 4 carbon atoms or acylaminophenyl wherein the alkyl group comprises 1 to 4 carbon atoms;

X represents hydrogen, halogen, nitro, alkyl of 1 to 4 carbon atoms and alkoxy with 1 to 4 carbon atoms, and X′ represents hydrogen, halogen or alkoxy with 1 to 4 carbon atoms.

2. Copying material according to claim 1, wherein at least 4 parts by weight of alkali-soluble polymer are present for each part by weight of compound comprising a diazosulphone group.

3. Copying material according to claim 2, wherein the alkali-soluble polymer is a novolak resin.

4. Copying material according to claim 1, wherein the compound comprising a diazosulphone group is (p-acetamidophenylsulphonyl)-(p-diethylamino-phenyl)-diimide.

5. Copying material according to claim 1, wherein the compound comprising a diazosulphone group is (p-tolyl-sulphonyl)-(p-anilinophenyl)-diimide.

6. Copying material according to claim 1, wherein the compound comprising a diazosulphone group is (p-tolyl-sulphonyl)-(p-dimethylaminophenyl)-diimide.

7. Copying material according to claim 1, wherein the compound comprising a diazosulphone group is (p-tolyl-sulphonyl)-(p-diethylaminophenyl)-diimide.

8. Copying material according to claim 1, wherein the compound comprising a diazosulphone group is (p-tolysul-phonyl)-(4-diethylamino-2-methyl-phenyl)-diimide.

9. A process for the photochemical preparation of a printing plate, which comprises exposing to actinic light under a master pattern a copying material according to claim 1 and developing the resulting positive image of the master pattern by dissolving the exposed portions of the coating in an aqueous alkaline liquid.

10. A process as outlined in claim 9 including the step of etching the developed plate in order to produce a positive relief printing plate.

* * * * *